United States Patent
Kusaka et al.

(10) Patent No.: US 7,326,741 B2
(45) Date of Patent: Feb. 5, 2008

(54) FRICTION MATERIAL

(75) Inventors: Satoshi Kusaka, Tokyo (JP); Hidetoshi Hishinuma, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 375 days.

(21) Appl. No.: 10/890,324

(22) Filed: Jul. 14, 2004

(65) Prior Publication Data

US 2005/0014862 A1    Jan. 20, 2005

(30) Foreign Application Priority Data

Jul. 18, 2003    (JP) ............... P.2003-276698

(51) Int. Cl.
*C08J 5/14* (2006.01)

(52) U.S. Cl. ................... 523/152; 523/155

(58) Field of Classification Search ........ 523/152, 523/155
See application file for complete search history.

(56) References Cited

U.S. PATENT DOCUMENTS

| | | | |
|---|---|---|---|
| 6,475,614 B2 * | 11/2002 | Hikichi | 428/332 |
| 6,670,408 B2 * | 12/2003 | Hikichi et al. | 523/149 |
| 6,677,041 B1 * | 1/2004 | Takahashi et al. | 428/402 |
| 6,838,161 B2 * | 1/2005 | Tadokoro et al. | 428/292.1 |
| 7,078,009 B2 * | 7/2006 | Ogawa et al. | 423/593.1 |

FOREIGN PATENT DOCUMENTS

| | | |
|---|---|---|
| EP | 1 170 257 A | 1/2002 |
| EP | 1 273 819 A | 1/2003 |
| EP | 1440940 | 7/2004 |
| FR | 2 802 543 A | 6/2001 |
| JP | 56-161429 | 12/1981 |
| JP | 63-195438 | 8/1988 |
| JP | 05-139808 | 6/1993 |
| JP | 8-32601 | 3/1996 |
| JP | 2000-256652 | 9/2000 |
| JP | 2000-272978 | 10/2000 |
| JP | 2001-20986 | 1/2001 |
| JP | 2001-172612 | 6/2001 |
| JP | 2003-82331 | 3/2003 |
| WO | WO 03/037797 A | 5/2003 |

OTHER PUBLICATIONS

Institut National De La Propriete Industrielle, Preliminary Search Report dated Oct. 25, 2005.
English-language abstract of JP 56-161429.
English-language abstract of JP 63-195438.
English-language abstract of JP 05-139808.
English-language abstract of JP 2000-256652.

* cited by examiner

*Primary Examiner*—Edward J. Cain
(74) *Attorney, Agent, or Firm*—Finnegan, Henderson, Farabow, Garrett & Dunner, L.L.P.

(57) ABSTRACT

In a friction material, columnar or scaly non-whisker-like alkali metal titanate or non-whisker-like alkali metal·alkaline-earth metal titanate having an average particle diameter in the range of 0.1 to 100 μm and an aspect ratio of 3 or less and an inorganic porous filler are compounded, and a friction material in which non-whisker-like lithium·potassium titanate having an average particle diameter in the range of 0.1 to 100 μm and an aspect ratio of 3 or less is compounded.

10 Claims, No Drawings

FRICTION MATERIAL

BACKGROUND OF THE INVENTION

The present invention relates to a friction material, in particular, a friction material that is used for industrial machinery, railway vehicles, luggage vehicles and passenger vehicles, more specifically brake pads, brake linings and clutch facings that are used in the above applications.

The friction material that is mainly used in brakes and so on is reinforced with a fiber to improve the strength. As the reinforcement fiber, as asbestos-substituting fiber, glass fiber, steel fiber, aramid fiber and potassium titanate fiber are used. Since these have respective characteristics, these are used in combinations of several kinds thereof.

Among these fibers, potassium titanate fiber is highly evaluated as abrasive inorganic fiber that can not only improve the strength of the friction material as a whole, the heat resistance and the wear resistance, but also improve the coefficient of friction of the friction material owing to the abrasiveness thereof, in particular, can secure high coefficient of friction during high load such as high-speed braking.

With an intention to provide a friction material excellent in the fading resistance and the resistance to squeaking, in patent literature 1 (:JP-A-2000-272978), a brake friction material in which potassium titanate whisker having high heat resistance and appropriate hardness is compounded is disclosed.

However, since the whisker is needle-like single crystals having a diameter in the range of 0.5 to 1 µm, a length in the range of 10 to 20 µm, that is, a high aspect ratio, from a viewpoint of work environment health, it is not desirable to use.

As a countermeasure to this, with an object of obtaining a friction material that, without using whisker-like potassium titanate that is unfavorable from a viewpoint of work environment health, can impart the same friction action and strength and can suppress a rise of manufacturing cost, patent literature 2 (:JP-A-2001-172612) discloses a friction material in which powdery or scaly potassium titanate having an aspect ratio of 3 or less is compounded, patent literature 3 (:JP-A-2001-020986) discloses a friction material where potassium titanate powder is compounded, and patent literature 4 (JP-A-2003-082331) discloses a friction material in which scaly or planar potassium titanate having an aspect ratio not exceeding 3 is compounded.

However, when, as in the above patent literatures 2 through 4, in place of potassium titanate whisker, non-whisker-like potassium titanate such as columnar, planar or scaly potassium titanate is compounded in a friction material, there is a problem in that since the porosity is lowered, resultantly, the fading characteristics are deteriorated and the high-speed effectiveness is lowered. For instance, test results of the fading characteristics of examples 1, 3, 6 and 10 in Table 1 of the patent literature 4 are shown with mark Δ that shows a unsatisfying result of min µ>0.20.

Furthermore, in addition to the above object, with another object of obtaining a friction material in which in dust generated owing to friction with mating member during use fine fibers are not mingled, patent literature 5 (JP-B-08-032601) discloses a friction material in which flaky polycrystalline fiber of a titanium compound is compounded.

However, the potassium titanate whisker disclosed in the patent literature 1 and the non-whisker-like potassium titanate such as columnar, planar, scaly and flaky ones disclosed in the patent literatures 2, 3, 4 and 5 all are higher in the melting point than plain cast iron that is the material of the mating member. Accordingly, in particular, in the case of a temperature of a friction surface rising as during high-load braking, there are problems in that the above materials transfer to the mating member, and the squeaking sound and wear of the friction material result.

SUMMARY OF THE INVENTION

The present invention was achieved in view of these situations. And, it is a first object of the present invention to provide a friction material that can inhibit a decrease in the porosity from occurring, that is generated when columnar, planar or scaly non-whisker-like potassium titanate is compounded with a friction material, and to provide a friction material which does not cause deterioration of the fading characteristics and lowering of the high-speed effectiveness.

Furthermore, the invention intends, as a second object thereof, to provide a friction material that can impart the friction characteristics equivalent to that of the case where both existing potassium titanate whisker and columnar, planar, scaly or flaky non-whisker-like potassium titanate are used, and can suppress squeaking sound and irregular friction during high load braking from occurring.

The present inventors studied hard to attain the first object, and found that in order to obtain a friction material that, without using the whisker-like potassium titanate system that is undesirable from a viewpoint of work environment health, does not cause the decrease of the porosity that is caused when the columnar, planar, or scaly non-whisker-like potassium titanate is compounded with a friction material, inorganic porous filler such as zeolite, diatom earth and activated carbon could be effectively used together, that is, the fading characteristics and the high-speed effectiveness could be inhibited from deteriorating. The present inventors paid attention to this finding and came to the present invention.

Furthermore, the inventors studied hard to achieve the second object and found that in order to obtain a friction material that has the friction performance equivalent to that when existing the whisker-like and non-whisker-like potassium titanate are used, and, without damaging a mating member (a brake rotor, a brake drum or the like), and that can suppress the squeaking sound and the irregular friction during high load braking from occurring, if a non-whisker-like titanate having a melting point lower than that of plain cast iron that is the material of the mating member is used, the desired friction material could be attained. The inventors paid attention to this finding and came to the present invention.

That is, the present invention solved the above problems according to the following means.

(1) In a non-asbestos base friction material including a reinforcement fiber, a friction modifier and a binder, non-whisker-like alkali metal titanate having an average particle diameter in the range of 0.1 to 100 µm and an aspect ratio of 3 or less and an inorganic porous filler are compounded.

(2) In the friction material according to (1), the inorganic porous filler is compounded in the range of 5 to 30% by volume with respect to the non-whisker like alkali metal titanate.

(3) In the friction material according to (1) or (2), the non-whisker like alkali metal titanate is surface-treated with a silane-coupling agent.

(4) In a non-asbestos base friction material including a reinforcement fiber, a friction modifier and a binder, non-whisker like alkali metal·alkaline-earth metal titanate having an average particle diameter in the range of 0.1 to 100 µm and an aspect ratio of 3 or less and an inorganic porous filler are compounded.

(5) In the friction material according to (4), the inorganic porous filler is compounded in the range of 5 to 30% by volume with respect to the non-whisker like alkali metal•alkaline-earth metal titanate.

(6) In the friction material according to (4) or (5), the non-whisker like alkali metal•alkaline-earth metal titanate is surface-treated with a silane-coupling agent.

(7) In a non-asbestos base friction material including a reinforcement fiber, a friction modifier and a binder, without including the whisker-like potassium titanate, non-whisker like lithium•potassium titanate having an average particle diameter in the range of 0.1 to 100 µm and an aspect ratio of 3 or less is compounded.

(8) In the friction material according to (7), the non-whisker-like lithium•potassium titanate is surface-treated with a silane-coupling agent.

(9) In the friction material according to (7) or (8), non-whisker-like potassium titanate is compounded by weight ratio equal to or less than the non-whisker-like lithium•potassium titanate.

DESCRIPTION OF THE PREFERRED EMBODIMENT

A friction material includes a reinforcement fiber, a friction modifier and a binder. In the invention, as the reinforcement fiber, neither asbestos fiber nor whisker-like potassium titanate that is undesirable from a viewpoint of work environment health is not used, instead, non-whisker-like alkali metal titanate or non-whisker-like alkali metal•alkaline-earth metal titanate having material the same as or similar to the whisker-like potassium titanate is used.

As alkali metal titanate, potassium titanate, sodium titanate and lithium•potassium titanate can be illustrated. As a chemical composition of the potassium titanate, potassium octatitanate ($K_2O.8TiO_2$), potassium hexatitanate ($K_2O.6TiO_2$) and potassium tetratitanate ($K_2O.4TiO_2$) can be cited, among them, former two members being preferable, the octatitanate being particularly preferable.

Furthermore, as the alkali metal•alkaline-earth metal titanate, magnesium•potassium titanate can be illustrated. Hereinafter, the alkali metal titanate and the alkali metal•alkaline-earth metal titanate are collectively abbreviated as titanate.

The non-whisker-like titanate is necessary to be 0.1 to 100 µm in average particle diameter and 3 or less in aspect ratio. When the particle diameter is smaller than 0.1 µm, the moldability becomes poor. On the other hand, when the particle diameter is larger than 10 µm, since the dispersion properties becomes poor and the mating member is damaged too much, it is necessary to be smaller than this value. Furthermore, when the aspect ratio exceeds 3, rather than non-whisker-like such as columnar, planar or scaly, properties become close to fiber. As a result, since a problem of the carcinorgenicity becomes anxious, the use thereof should be avoided.

An amount of the non-whisker-like titanate used in the friction material is preferably in the range of 1 to 30% by volume relative to a total volume of the friction material. When it is less than 1% by volume, since uniform dispersion can be attained with difficulty during mixing, a desired effect of improving the friction characteristics cannot be obtained. On the other hand, when it is more than 30% by volume, other performance such as the moldability becomes deteriorated.

Furthermore, the non-whisker-like titanate can be preferably used with a surface thereof treated with a silane-coupling agent. The surface-treated titanate can be easily mixed with other materials in the manufacture of a friction material; accordingly, the strength of a product according to the thermoforming can be advantageously made larger. An amount of the silane-coupling agent used is preferably in the range of 0.3 to 5% by weight relative to the non-whisker-like titanate.

As the inorganic porous filler that is used together with the non-whisker-like titanate to increase the porosity, zeolite, diatom earth, activated carbon and vermiculite can be illustrated. An amount compounded is, by volume ratio with respect to the non-whisker-like titanate, preferably in the range of 5 to 30%. When it is excessively slightly added, an increase in the porosity becomes smaller. On the other hand, when it is excessively added, since a ratio of improvement in the fading characteristics and the high-speed effectiveness becomes smaller. A particle diameter thereof is preferably in the range of 0.1 to 500 µm. When the particle diameter is less than 0.1 µm, the moldability becomes deteriorated; on the other hand, when it is larger than 500 µm, the dispersibility becomes deteriorated.

As non-whisker-like titanate that does not damage the mating member, lithium•potassium titanate can be cited. Since the lithium•potassium titanate is lower in the melting point than plain cast iron that is the material of the mating member, particularly in the case of a temperature of friction surface becoming higher as during high load braking, it neither damage the mating member nor transfer thereto, as a result, the squeaking sound and irregular wear of the friction material can be suppressed from occurring.

The non-whisker-like lithium•potassium titanate can be used together with the non-whisker-like potassium titanate of an amount, by weight ratio, equivalent to or less than that of the lithium•potassium titanate. In this case, during the high load braking, performance similar to that in the case where only the non-whisker-like lithium•potassium titanate is used can be obtained.

The physical characteristics of the existing potassium titanate fiber, the non-whisker-like lithium•potassium titanate according to the invention, the non-whisker-like potassium titanate, and the plain cast iron that is the material of the mating member are shown in Table 1.

TABLE 1

Melting Point and Hardness of Potassium Titanate

| Name of material | Melting point (° C.) | Moh's Hardness |
|---|---|---|
| Plain cast iron | 1200 to 1250 | 4 |
| Potassium titanate fiber | 1310 to 1385 | 4 |
| Non-fiber-like potassium titanate | 1300 to 1350 | 4 |
| Lithium . potassium titanate | 1150 to 1200 | 4 |

To manufacture a friction material according to the invention, in a friction material including a reinforcement fiber, a friction modifier and a binder, the raw material or raw materials are mixed, and a mixture thereof is subjected to preforming and thermoforming according to an ordinary manufacturing method to manufacture.

In the friction material according to the invention, as the reinforcement fiber, for instance, organic fiber such as aromatic polyamide fiber and flame-resistant acrylic fiber, and metal fiber such as copper fiber and steel fiber can be cited.

As the inorganic filler, for instance, particles of metal such as copper, aluminum and zinc, and barium sulfate and calcium carbonate can be cited.

As the binder, thermosetting resins such as phenolic resins (including straight phenolic resin and various kinds of phenolic resins modified by rubber and so on), melamine resins and epoxy resins can be cited.

Furthermore, as the friction modifiers, metal oxides such as alumina, silica, magnesia, zirconia, chromium oxide and quartz, and organic friction modifiers such as synthetic rubber and cashew resin can be cited, and as solid lubricants, for instance, graphite and molybdenum disulfide can be cited.

As the composition of the friction material, various composition ratios can be adopted.

That is, these, depending on the characteristics demanded for products, for instance, the coefficient of friction, the wear resistance, the vibration resistance, and the squeaking resistance, can be used singularly or in combinations of two or more kinds.

In a process of manufacturing a friction pad for a disc brake, a pressure plate is formed into a predetermined shape according to sheet metal processing, followed by applying a degreasing process and a primer process, further followed by coating an adhesive, a preformed body is formed by compounding powder raw materials such as a reinforcement fiber such as heat-resistant organic fiber and metal fiber, inorganic/organic filler, a friction modifier and a thermosetting resin binder, followed by thoroughly mixing to make uniform the raw materials, further followed by molding (preforming) under a predetermined pressure at normal temperature, and both members are subjected to thermoforming under a predetermined temperature and a pressure in the thermoforming process to solidly fix into one body, followed by after-curing, further followed by applying finishing. The above process is the same as the existing method.

EXAMPLES

In what follows, the present invention will be specifically explained with reference to examples. However, the invention is not restricted only to these examples.

Examples 1 through 8 and Comparative Examples 1 through 3

Firstly, manufacture of a friction material that can inhibit the porosity from decreasing and can inhibit the fading characteristics and the high-speed effectiveness from deteriorating will be explained.

(Materials of Samples of Friction Material)

As materials of friction material when samples of friction material are manufactured, the followings are used. When samples are manufactured, materials are selected from these and compositions of samples are varied.

Binder: phenolic resin

Organic friction modifier: cashew dust

Filler: barium sulfate

Abrasive: zirconia

Solid lubricant: graphite

Reinforcement fiber: copper fiber/aramid pulp

Abrasive: planar potassium octatitanate with or without surface treatment, columnar potassium hexatitanate without surface treatment Inorganic porous filler: zeolite/diatom earth (Composition of Samples of Friction Material)

As compositions of the friction material when samples of the friction material are prepared, with compounding ratios set as shown in Table 2 below, examples 1 through 8 were prepared.

For comparison, ones (comparative examples 1 through 3) in which, without using the inorganic porous filler, the non-whisker-like potassium titanate was used were also prepared.

That is, samples according to comparative examples 1 through 3 are friction materials in which only potassium titanate (planar and columnar ones without surface treatment due to a silane-coupling agent, and planar one surface treated with a silane-coupling agent) was used and the inorganic porous filler was not used together to improve the porosity.

In examples 1 through 4, the inorganic porous filler was used together at a ratio of 20% by volume with respect to potassium titanate of examples 1 through 3, and for that portion barium sulfate as the filler was reduced.

In examples 5 and 6, a ratio of the inorganic porous filler relative to potassium titanate in example 2 was altered to 5 and 30%.

In examples 7 and 8, with a ratio of the inorganic porous filler relative to potassium titanate in example 2 maintained at 20%, a volume ratio of potassium titanate was changed to 5 and 30%, and a volume ratio of barium sulfate was changed to 40 and 10%.

(Preparation of Samples of Friction Material)

Pads of samples having the abovementioned compositions were prepared according to an existing manufacturing method.

TABLE 2

| | Composition (% by volume) | Example | | | | | | | | Comparative example | | |
|---|---|---|---|---|---|---|---|---|---|---|---|---|
| | | 1 | 2 | 3 | 4 | 5 | 6 | 7 | 8 | 1 | 2 | 3 |
| Binder | Phenolic resin | 18 | 18 | 18 | 18 | 18 | 18 | 18 | 18 | 18 | 18 | 18 |
| Friction modifier | Cashew dust | 16 | 16 | 16 | 16 | 16 | 16 | 16 | 16 | 16 | 16 | 16 |

TABLE 2-continued

|  | Composition (% by volume) | Example 1 | Example 2 | Example 3 | Example 4 | Example 5 | Example 6 | Example 7 | Example 8 | Comparative example 1 | Comparative example 2 | Comparative example 3 |
|---|---|---|---|---|---|---|---|---|---|---|---|---|
| Filler | Barium sulfate | 28 | 28 | 28 | 28 | 30.25 | 26.5 | 40 | 10 | 31 | 31 | 31 |
| Abrasive | Zirconia | 1.5 | 1.5 | 1.5 | 1.5 | 1.5 | 1.5 | 1.5 | 1.5 | 1.5 | 1.5 | 1.5 |
| Lubricant | Graphite | 8 | 8 | 8 | 8 | 8 | 8 | 8 | 8 | 8 | 8 | 8 |
| Reinforcement fiber | Copper fiber | 3 | 3 | 3 | 3 | 3 | 3 | 3 | 3 | 3 | 3 | 3 |
|  | Aramid pulp | 7.5 | 7.5 | 7.5 | 7.5 | 7.5 | 7.5 | 7.5 | 7.5 | 7.5 | 7.5 | 7.5 |
| Titanate | Potassium titanate (planar) (octa-titanate) | 15 | — | — | — | — | — | — | — | 15 | — | — |
|  | Potassium titanate (planar) (octa-titanate) (treated with 1% silane-coupling agent) | — | 15 | — | 15 | 15 | 15 | 5 | 30 | — | 15 | — |
|  | Potassium titanate (columnar) (hexa-titanate) | — | — | 15 | — | — | — | — | — | — | — | 15 |
| Inorganic porous filler | Zeolite | 3 | 3 | 3 | — | 0.75 | 4.5 | 1 | 6 | — | — | — |
|  | Diatom earth | — | — | — | 3 | — | — | — | — | — | — | — |
|  | Total | 100 | 100 | 100 | 100 | 100 | 100 | 100 | 100 | 100 | 100 | 100 |

(Evaluation of Friction Material)

With a disc brake that uses a rotor, tests below were carried out.

(1) Porosity

The porosity due to oil-immersion was measured in accordance with JIS D4418.

(2) High-Speed Effectiveness and Fade Minimum μ

A JASO performance test was carried out in accordance with JASO C402.

(Test Result)

Test results are shown in Table 3.

TABLE 3

| Result of evaluation | Example 1 | Example 2 | Example 3 | Example 4 | Example 5 | Example 6 | Example 7 | Example 8 | Comparative example 1 | Comparative example 2 | Comparative example 3 |
|---|---|---|---|---|---|---|---|---|---|---|---|
| Porosity (%) | 14 | 14 | 14 | 12 | 9 | 16 | 8 | 18 | 7 | 7 | 7 |
| High-speed effectiveness (μ)*1 | 0.46 | 0.44 | 0.42 | 0.43 | 0.41 | 0.46 | 0.41 | 0.48 | 0.39 | 0.39 | 0.38 |
| Fade minimum μ*2 | 0.3 | 0.29 | 0.28 | 0.28 | 0.27 | 0.31 | 0.27 | 0.33 | 0.26 | 0.25 | 0.24 |
| Overall rating*3 | ◯ | ◯ | ◯ | ◯ | ◯ | ◯ | ◯ | ◯ | X | X | X |

*1 JASO second effectiveness μ at 0.6 G
*2 JASO first fade minimum μ
*3 ◯: superior in the high-speed effectiveness and the fade minimum μ to comparative example
X: inferior in the high-speed effectiveness and the fade minimum μ to comparative example From results shown in Table 3, it is found that effects below were obtained.

(1) When columnar, planar, scaly non-whisker-like alkali metal titanate or alkali metal·alkaline-earth metal titanate and inorganic porous filler are used together, in comparison with comparative examples, the porosity was increased and the high-speed effectiveness and the fade minimum μ were improved.

(2) Even when titanate was not surface-treated, the effects were exhibited.

(3) An amount of the inorganic porous filler was effective when it was in the range of 5 to 30% by volume relative to that of titanate.

(4) An amount of titanate compounded with the friction material was effective when it was in the range of 5 to 30% by volume relative to that of the friction material.

Examples 9 through 15 and Comparative Examples 4 and 5

In the next place, preparation of a friction material that can suppress the squeaking sound and the excessive wear during high load braking from occurring will be explained.

(Material of Samples of Friction Material)

Except that in place of the inorganic porous filler that was used together in the materials of samples of friction material in order to inhibit the porosity from decreasing, lithium•potassium titanate (with and without surface treatment with a silane-coupling agent) as titanate as the abrasive was added, the same materials were adopted.

(Composition of Samples of Friction Material)

As compositions of the friction material when samples of the friction material were prepared, with compounding ratios set as shown in Table 4 below, examples 9 through 15 were prepared.

In examples 11 through 13, in comparison to an amount of lithium•potassium titanate compounded in example 9 being 15% by weight, an amount thereof compounded were varied in the range of 1 to 30% by weight.

In examples 14 and 15, 50% of an amount of lithium•potassium titanate compounded was replaced by non-whisker-like potassium titanate.

(Preparation of Samples of Friction Material)

Pads of samples having the above compositions were manufactured according to an existing method.

TABLE 4

| | Example | | | | | | | Comparative example | |
|---|---|---|---|---|---|---|---|---|---|
| Composition (% by volume) | 9 | 10 | 11 | 12 | 13 | 14 | 15 | 4 | 5 |
| Phenolic resin (binder) | 10 | 10 | 10 | 10 | 10 | 10 | 10 | 10 | 10 |
| Cashew dust (friction modifier) | 10 | 10 | 10 | 10 | 10 | 10 | 10 | 10 | 10 |
| Barium sulfate (filler) | 40 | 40 | 54 | 48 | 25 | 40 | 40 | 40 | 40 |
| Zirconia (abrasive) | 2 | 2 | 2 | 2 | 2 | 2 | 2 | 2 | 2 |
| Graphite (lubricant) | 8 | 8 | 8 | 8 | 8 | 8 | 8 | 8 | 8 |
| Copper fiber (reinforcement fiber) | 10 | 10 | 10 | 10 | 10 | 10 | 10 | 10 | 10 |
| Aramid pulp (reinforcement fiber) | 5 | 5 | 5 | 5 | 5 | 5 | 5 | 5 | 5 |
| Lithium · potassium titanate | 15 | — | 1 | 7 | 30 | 7.5 | 7.5 | — | — |
| Lithium · potassium titanate (treated with 1% silane-coupling agent) | — | 15 | — | — | — | — | — | — | — |
| Potassium titanate (planar) (octa-titanate) | — | — | — | — | — | 7.5 | — | 15 | — |
| Potassium titanate (columnar) (hexa-titanate) | — | — | — | — | — | — | 7.5 | — | 15 |
| Total | 100 | 100 | 100 | 100 | 100 | 100 | 100 | 100 | 100 |

(Evaluation of friction material)
With a disc brake that uses a rotor, tests below were carried out.
(Items of evaluation)
1) Evaluation of the effectiveness due to JASO performance test (JASO C402).
2) Transfer to the mating member after fade ○: No transfer, X: transfer (visually observed)
3) Wear amount of pad after fade After the test, the wear amount was compared in terms of millimeter unit.
4) Evaluation of squeaking sound due to noise test ○: No squeaking sound, X: squeaking sound For comparison, one (comparative example 4) in which planar potassium octa-titanate was used and one (comparative example 5) in which columnar potassium hexa-titanate was used were also prepared.

That is, samples according to comparative examples 4 and 5 are existing friction materials in which non-whisker-like potassium titanate was used (one in accordance with example 2 of patent literature 3).

In example 9, existing planar potassium octa-titanate in the composition of comparative example 4 was replaced by lithium•potassium titanate.

In example 10, lithium•potassium titanate of example 9 was surface treated with 1% by weight of silane-coupling agent.

(Test Method)

Evaluation of the effectiveness: The coefficient of friction was measured in accordance with JASO performance test (JASO C402).

Fade test: After two cycles of the first fade recovery and the second fade recovery of JASO performance test (JASO C402), transfer to the mating member was checked and the wear amount of the pad was measured.

Squeaking sound: Squeaking test with an actual car was performed.

(Test Result)

Test results are shown in Table 5.

TABLE 5

|  |  | Example | | | | | | | Comparative example | |
|---|---|---|---|---|---|---|---|---|---|---|
| Result of evaluation | | 9 | 10 | 11 | 12 | 13 | 14 | 15 | 4 | 5 |
| JASO second | 50 Km/h | 0.45 | 0.45 | 0.43 | 0.44 | 0.46 | 0.45 | 0.45 | 0.42 | 0.45 |
| effectiveness | 100 Km/h | 0.43 | 0.42 | 0.4 | 0.41 | 0.44 | 0.43 | 0.43 | 0.4 | 0.43 |
| μ at 0.6G | 130 Km/h | 0.4 | 0.4 | 0.37 | 0.39 | 0.42 | 0.4 | 0.4 | 0.37 | 0.4 |
| JASO first fade minimum μ | | 0.28 | 0.27 | 0.23 | 0.25 | 0.3 | 0.28 | 0.28 | 0.25 | 0.28 |
| Transfer to the mating member after fade test | | ○ | ○ | ○ | ○ | ○ | ○ | ○ | X | X |
| Wear amount of friction material after fade test | | 0.25 | 0.23 | 0.33 | 0.3 | 0.21 | 0.36 | 0.34 | 0.45 | 0.42 |
| Squeaking sound in squeaking test | | ○ | ○ | ○ | ○ | ○ | ○ | ○ | X | X |
| Work environment health | | ○ | ○ | ○ | ○ | ○ | ○ | ○ | X | ○ |
| Overall rating (○: excellent, X: poor) | | ○ | ○ | ○ | ○ | ○ | ○ | ○ | X | X |

From results shown in Table 5, it is found that the following results were obtained.
(1) When non-whisker-like lithium•potassium titanate (with surface treatment and without surface treatment) was used in place of existing potassium titanate whisker and columnar, planar, scaly non-whisker-like potassium titanate, without sacrificing the friction performance, the transfer to the mating member, squeaking sound and the excessive wear during high load braking could be inhibited from occurring.
(2) A compounding effect of the non-whisker-like lithium•potassium titanate was obtained in the range of 1 to 30% by weight.
(3) When the non-whisker-like lithium•potassium titanate was used, the columnar, planar, scaly non-whisker-like potassium titanate could be used together with an identical effect.

According to the present invention, a decrease in the porosity when columnar, planar and scaly non-whisker-like alkali metal titanate or non-whisker-like alkali metal•alkaline-earth metal titanate is applied to a non-asbestos base friction material can be suppressed from occurring by using together an inorganic porous filler such as zeolite, diatom earth and activated carbon, resulting in inhibiting the fading resistance and the high-speed effectiveness from deteriorating.

Furthermore, according to the invention, when lithium potassium titanate that has appropriate heat resistance and hardness and a melting point lower than that of plain cast iron that is the material of the mating member is compounded together with a friction material, with the friction performance equivalent to that of a friction material in which existing potassium titanate whisker and columnar, planar, scaly non-whisker-like potassium titanate are compounded maintaining, the squeaking sound and excessive wear during the high load braking can be suppressed.

What is claimed is:

1. A non-asbestos base friction material with a reinforcement fiber, a friction modifier, and a binder, comprising: a non-whisker-like alkali metal titanate having an average particle diameter in the range of 0.1 to 100 μm and an aspect ratio of 3 or less; and an inorganic porous filler comprising at least one of zeolite, diatom earth, and activated carbon.

2. The friction material according to claim 1, wherein the inorganic porous filler is compounded in the range of 5 to 30% by volume with respect to the non-whisker-like alkali metal titanate.

3. The friction material according to claim 1, wherein the non-whisker-like alkali metal titanate is surface-treated with a silane-coupling agent.

4. The friction material according to claim 2, wherein the non-whisker-like alkali metal titanate is surface-treated with a silane-coupling agent.

5. A non-asbestos base friction material with a reinforcement fiber, a friction modifier and a binder, comprising: a non-whisker alkali metal•alkaline-earth metal titanate having an average particle diameter in the range of 0.1 to 100 μm and an aspect ratio of 3 or less; and an inorganic porous filler comprising at least one of zeolite, diatom earth, and activated carbon.

6. The friction material according to claim 5, wherein the inorganic porous filler is compounded in the range of 5 to 30% by volume with respect to the non-whisker-like alkali metal alkaline-earth metal titanate.

7. The friction material according to claim 5, wherein the non-whisker-like alkali metal alkaline-earth metal titanate is surface-treated with a silane-coupling agent.

8. The friction material according to claim 6, wherein the non-whisker-like alkali metal•alkaline-earth metal titanate is surface-treated with a silane-coupling agent.

9. A non-asbestos base friction material with a reinforcement fiber, a friction modifier and a binder, without comprising whisker-like potassium titanate, comprising a non-whisker-like lithium•potassium titanate having an average particle diameter in the range of 0.1 to 100 μm and an aspect ratio of 3 or less compounded with an amount of potassium titanate, wherein the amount of potassium titanate is from cireater than 0 to equal to the amount of lithium potassium titanate by weight.

10. The friction material according to claim 9, wherein the non-whisker-like lithium•potassium titanate is surface-treated with a silane-coupling agent.

* * * * *

UNITED STATES PATENT AND TRADEMARK OFFICE
CERTIFICATE OF CORRECTION

| | |
|---|---|
| PATENT NO. | : 7,326,741 B2 |
| APPLICATION NO. | : 10/890324 |
| DATED | : February 5, 2008 |
| INVENTOR(S) | : Satoshi Kusaka and Hidetoshi Hishinuma |

It is certified that error appears in the above-identified patent and that said Letters Patent is hereby corrected as shown below:

Claim 9, col. 12, line 56, "cireater" should read -- greater --.

Signed and Sealed this

Thirtieth Day of November, 2010

David J. Kappos
*Director of the United States Patent and Trademark Office*